Jan. 4, 1966  G. J. FILIA  3,227,014
WIRESTRIPPING TOOL HAVING A LONGITUDINALLY
ACTING SCRAPING BLADE
Filed Nov. 13, 1962  2 Sheets-Sheet 1
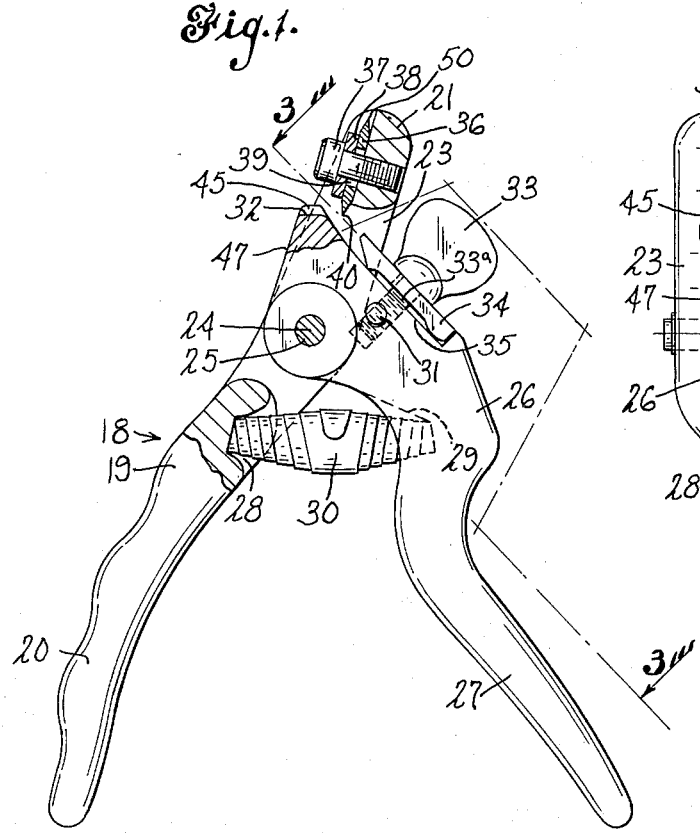
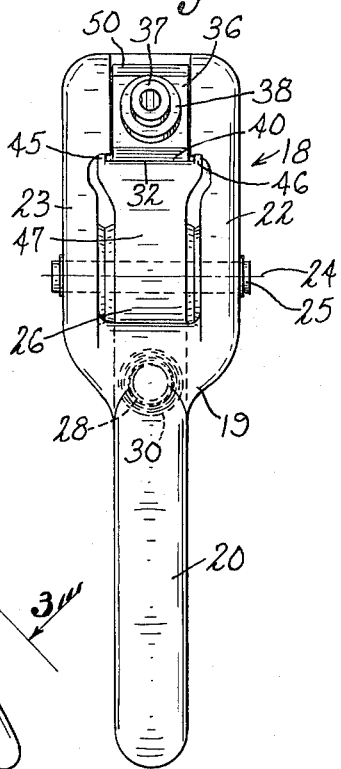
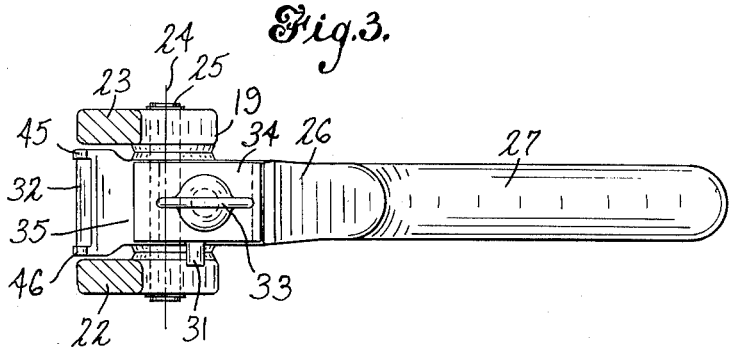
INVENTOR
George J. Filia
BY
Spencer, Rockwell & Bartholow
ATTORNEYS Jan. 4, 1966  G. J. FILIA  3,227,014
WIRESTRIPPING TOOL HAVING A LONGITUDINALLY
ACTING SCRAPING BLADE
Filed Nov. 13, 1962  2 Sheets-Sheet 2
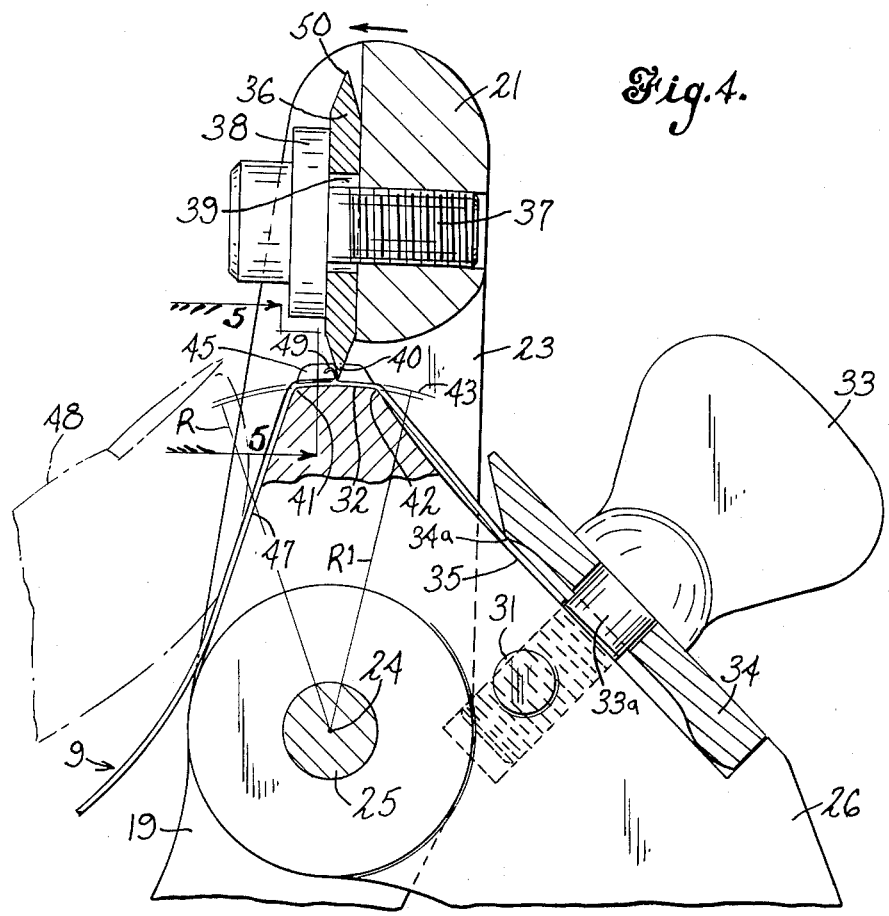
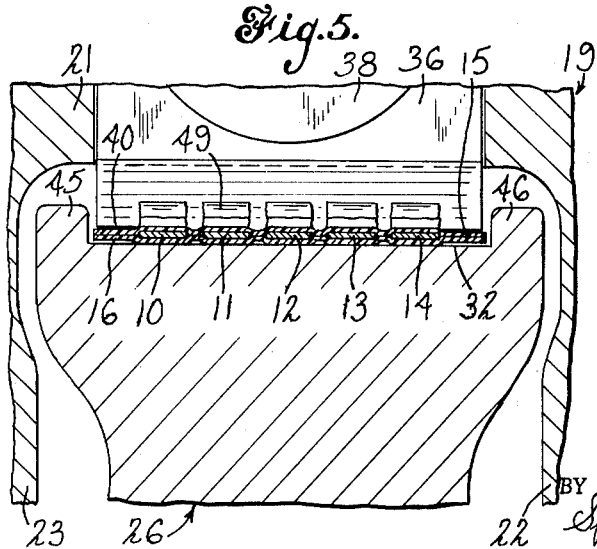
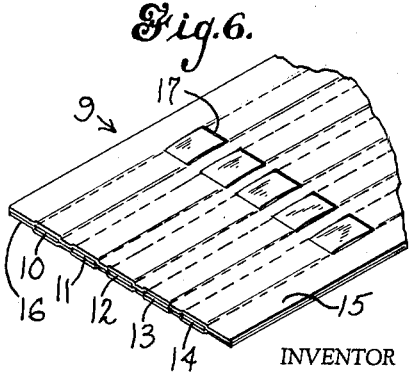
INVENTOR
George J. Filia
BY Spencer, Rockwell & Bartholow
ATTORNEYS – # United States Patent Office 3,227,014
Patented Jan. 4, 1966

3,227,014
WIRESTRIPPING TOOL HAVING A LONGITUDINALLY ACTING SCRAPING BLADE
George J. Filia, Shelton, Conn., assignor to Sargent & Company, New Haven, Conn.
Filed Nov. 13, 1962, Ser. No. 237,156
7 Claims. (Cl. 81—9.5)

This invention relates to insulated electrical conductor cables of a type comprising spaced conductors sealed within an insulating tape and more particularly relates to a technique and apparatus for exposing the conductors in order that electrical connections may be made thereto.

A multiple-conductor cable of this type may comprise a plurality of spaced-apart electrical conductors laminated between strips of plastic material into a very thin, essentially flat, flexible tape-like cable. A conductor cable of this type is marketed by the International Resistance Company of Philadelphia, Pennsylvania, under the tradename "Polystrip."

Various techniques have been proposed to strip insulating material from conductor cables of this type to expose the conductors thereof so that electrical connections may be made to the conductors. The known techniques, for the most part, comprise heating the plastic insulation to melt the insulation and then scraping the melted insulation away; grinding away the insulation above a conductor ribbon; or cutting the insulation away from a conductor. However, the presently known techniques for stripping insulation from cables of the type described are not considered entirely satisfactory.

This invention provides a new and improved technique and apparatus for stripping insulation from such cables wherein insulation may be simultaneously stripped from all or any number of the conductors in a given area of the cable.

Accordingly, it is an object of this invention to provide a new and improved technique for stripping insulation from a conductor cable of the type described wherein all conductors of such a cable may have the insulation stripped therefrom simultaneously by a cutting technique.

It is another object of this invention to provide a new and improved tool for simultaneously stripping insulation from all or any number of the conductors of a cable of the type described.

It is a further object of this invention to provide a technique and apparatus therefor for simultaneously stripping the insulation from all or selected conductors of a cable of the type described where the cutting stroke of the stripper moves longitudinally with respect to the conductors to be stripped to insure that the stripping tool does not cut or rupture any of the conductors.

It is a still further object of this invention to provide a stripping tool for stripping insulation from a conductor of the type described, longitudinally of the conductors wherein the stripping blade enters and leaves the cable during stripping thereof at an angle with the surface of the cable which greatly diminishes or eliminates the possibility of the stripping tool gouging or otherwise upsetting the insulating material surrounding the conductors.

Briefly stated, the invention, in one form thereof, comprises an apparatus for placing a portion of the conductor cable desired to have insulation removed therefrom over a surface defined by rotation of a line about a reference axis in parallel relation thereto, positioning a stripping tool in operative relation to said tape with the stripping edge of the tool at a radial distance from the reference axis equal to the radial dimension of the surface plus the thickness of the cable, less the thickness of the insulation to be stripped therefrom and moving the stripping tool rotatively about the reference axis parallel to the defined surface.

The features of the invention which are believed to be novel are pointed out with particularity in the claims appended to and froming part of this specification. However, the invention both as to its organization and operation, together with further objects and advantages thereof may be best understood by reference to the following description taken in conjunction with the drawings wherein:

FIG. 1 is a side view, partially in section, of a hand tool arranged for practicing the invention;

FIG. 2 is a view of the tool of FIG. 1 seen from the left side thereof as illustrated in FIG. 1;

FIG. 3 is a view seen along line 3—3 of FIG. 1;

FIG. 4 is an enlarged view of a portion of the tool as shown in FIG. 1 with a tape-like conductor cable positioned therein and having a stripping operation performed thereon.

FIG. 5 is a view seen along lines 5—5 of FIG. 4;

FIG. 6 illustrates, in perspective, a portion of a multiple conductor, tape-like conductor cable, having a portion of the insulation overlying the conductors thereof stripped away in accordance with practice of the invention.

In the drawings, reference is first made to FIG. 6 which illustrates a multiple-conductor cable 9 of the type comprising a plurality of conductors 10, 11, 12, 13 and 14 in substantially ribbon form, sandwiched between sheets of insulating material 15 and 16. The insulating material sheets 15 and 16 are preferably of a plastic substance and flexible. The insulating sheets 15 and 16 may be of thermo-plastic material which are heat-sealed together to encapsulate or laminate the conductors therebetween. Alternatively, the sheets 15 and 16 may be chemically sealed together, with the conductors 10–14 imbedded therein, by means of an adhesive applied between the sealed facing surfaces thereof. This invention is concerned with a technique of removing portions of the insulating sheets, insulating sheet 15 as illustrated in FIG. 6, to provide openings such as windows 17 which expose one or more of the conductors 10–14 in order that electrical connections may be made thereto.

A preferred apparatus or tool 18 for practicing the invention, as illustrated in FIGS. 1, 2 and 3, comprises a first lever member 19 having a handle portion 20 and a tool-holding portion 21. Lever member 19 has spaced-apart jaws 22 and 23 extending from handle portion 20 which are joined at the other end thereof by tool-holding portion 21. Pivotally mounted between jaws 22 and 23 about a reference axis 24, which is the axis of a pin 25 and secured in jaws 22 and 23 is a second lever member 26 having a handle portion 27. The handle portions 20 and 27 of members 19 and 26 have wells or recesses 28 and 29, respectively, defined therein adapted to receive the ends of volute spring 30 which urges the handle portions of 20 and 27 apart. To limit the spacing of handle portions 20 and 27, a limit means comprising a stop 31 extends from member 26 which provides a stop for one of the jaws, as illustrated in jaw 23. Member 26 provides a surface 32 upon which a cable 9 is adapted to be positioned to have insulation stripped therefrom. Member 26 further carries a means for securing a tape 9 thereon which it is desired to have insulation stripped therefrom. The illustrated securing means comprises a thumb screw 33 threadably received into member 26 and adapted to compress a securing plate 34 against surface 35.

Tool-holding portion 21 of member 19 is adapted to have a stripping tool 36 secured thereon by means of a bolt 37 threadably received into portion 21 and compressively engaging a pressure plate 38 which bears against blade 36. Blade 36 is preferably formed with a slot 39 therein to allow substantially vertical adjustment of blade 36, and has a stripping edge 40 extending laterally of its direction of movement with respect to surface 32.

In the tool 18 as thus far described, it may be seen that when handle portions 20 and 27 are moved together, edge 40 of blade 36 is rotated over and beyond surface 32.

Reference is now made to FIGS. 4 and 5 which more clearly illustrate the operation of the invention with a conductor cable 9 inserted within the tool 18. In accordance with the invention, the work-positioning surface 32 is defined by a line rotated about axis 24 in parallel relation thereto, or otherwise stated is at a constant radial dimension with respect to axis 24. The surface 32 terminates in small radii 41 and 42 at either end thereof as hereinafter explained. When the tool 18 is actuated by moving the handle portions 20 and 27 together the stripping edge 40 of blade 26, which for a given stripping operation is set at a fixed distance from axis 24, moves in a path or arc indicated by reference numeral 43 over surface 32 and beyond at a constant distance from axis 24, and therefore moves parallel to surface 32. Surface 32, by virtue of radius 42, extends into surface 35.

In the illustrated tool it may be noted in FIG. 5 that the surface 32 is defined on either side thereof by guide ledges 45 and 46 which aid in positioning a conductor cable 9 of given width therein. In accordance with one aspect of the invention the radius 42 is chosen such that the edge 40 of blade 36 as it travels along path 43 will enter the insulation on conductor cable 9 at an angle approaching ninety degrees defined by the direction of movement of edge 40 and the exposed surface of the tape 9 which is first contacted by edge 40.

To strip a conductor cable 9 in accordance with the invention the cable 9 is positioned over surface 32 and extended down to the shank 33a of thumb screw 33 which provides a stop therefor. Thumb screw 33 is then actuated to press edge 34a of plate 34 downwardly against surface 35 to secure the cable 9 therebetween. The cable 9 is then tensioned, as for example, by urging it downwardly along surface 47 on member 26 as exemplified by the finger 48 in broken line or alternatively a mechanical clamping device may be provided to hold the cable on surface 47. Tensioning of the cable along surface 47 ensures tautness of the cable on surface 32 and an even depth of cut by edge 40 along the length of the cable. The handle portions 20 and 27 of members 19 and 26, respectively, are then moved together causing members 19 and 26 to relatively rotate about axis 24 to thus cause stripping edge 40 to engage cable 9 along the arc indicated by the numeral 43, terminating radius $R_1$ from axis 24. The edge 40 of blade 36 then rotates about axis 24 following path 43 which is parallel to surface 32, and following path 43, edge 40 of blade 36 peels portions 49 from the insulation above the conductors 10–14 of conductor cable 9. It may be seen that inasmuch as the edge 40 of blade 26 always moves parallel to surface 32, it strips the insulation from conductor cable 9 on surface 32 to a constant depth from the surface of the conductor cable. As the blade edge 40 passes beyond surface 32 the peelings or strippings 49 will usually remain integral with the insulation on conductor cable 9, however, on the return stroke of blade edge 40 as handle members 20 and 27 are allowed to move apart under the bias of volute spring 30, blade edge 40 will again contact tape 9 along the path or arc 43 and cut off the strippings or peelings 49. It may be noted that the radius 41 joining surface 47 to surface 32 is chosen in the same manner as radius 42 so that the blade edge 40 upon its return stroke enters the insulation on conductor cable 9, overlying conductors 10–14 in a direction of travel approaching a right angle along line 43 with the surface of the cable along the line of contact.

In preparing to strip insulation from a conductor cable 9 the edge 40 of blade 36 is adjusted on tool holder 21 to a distance from axis 24 equal to the distance between axis 24 and surface 32, plus the thickness of the cable 9, less depth of the insulation above conductors 10 through 14. With the stripping edge 40 so adjusted, the stripping edge 40, in stripping insulation from cable 9 over surface 32 always moves in the longitudinal direction of the conductors 10–14 and in a depth into the cable 9 such that the insulation is stripped from above conductors without contacting the conductors or the insulation therebetween, to provide the windows 17 in the cable above the conductors 10–14.

Moreover, inasmuch as the stripping edge 40 is moving longitudinally with respect to the conductors 10 through 14 if the edge 40 should slightly engage a conductor there would be less tendency to rupture the conductor than if the blade edge 40 were moving transversely thereof.

It may be noted that the stripping blade 36 may be provided with a second edge 50 thereon oppositely disposed from edge 40. In the illustrated tool a center line drawn between the edges 40 and 50 would coincide with a radius from axis 24, however, under some circumstances it may be desirable to have the edge 40 be in a leading position with respect to the edge 50 to modify the angle of attack of edge 40 along the line 43 where it initially engages tape 9. Such modification may take place dependent on the type of insulation material to be stripped, and the desired angle of attack of the edge 40 on the tape 9 along path or arc 43.

It is to be understood that the disclosed tool 18 in the form illustrated provides but one apparatus for practice of the invention and the mechanical structure thereof may be modified. For example, the tool 18 could be so constructed that the cable 9 to be stripped could be inserted onto a surface, such as surface 32, sideways thereof instead of being threaded between guides, as exemplified by ledges 45 and 46. Moreover, since in many applications it may be desirable to strip insulation from the conductor cable 9 other than at a fixed distance from an end thereof, cable securing means could be provided, other than thumb screw 33 and clamping plate 34, by which any portion of a length of cable 9 could be positioned on the surface 32. In some applications, it may be desirable to strip insulation from one or more but not all of the conductors of a cable. In such applications a stripping blade may be provided with stripping edges or teeth designed to strip insulation to expose only selected conductors.

While the invention has been disclosed in a preferred form thereof, together with a preferred apparatus for practicing the invention, other forms and modification to the disclosed example of the invention may occur to those skilled in the art which do not depart from the spirit and scope of the invention. Therefore, it is intended to cover in the appended claims all embodiments and modifications of the invention which do not depart from the spirit and scope of the invention.

What is claimed is:

1. Apparatus for stripping insulation from an insulated conductor cable comprising a conductor sealed within an insulator comprising: a first lever member providing a cable supporting surface having a constant radial dimension from a reference axis; a second lever member having a stripping edge positioned outwardly of said surface and adapted to move parallel thereto about said reference axis at a predetermined distance therefrom; and means for moving said stripping edge over said surface comprising handle portions on said lever members, said movement defining an angle from said reference axis greater than the angle subtended by said surface with respect to said reference axis.

2. Apparatus for stripping insulation from an insulated conductor cable, comprising: a first member having spaced-apart jaws; a second member pivotally mounted between said jaws about a reference axis; said first member having a handle portion and a tool mounting portion oppositely disposed with respect to said pivotal axis, said portion joining said jaws; said second member providing a cable receiving surface thereon between said axis and said tool mounting portion of said first member, said surface being defined by rotation of a line about said axis; positioning means on said second member adapted to position a conductor cable thereon so that a predetermined portion of the cable will overlie said surface; said tool mounting portion being adapted to receive a tool thereon having a blade extending across said surface transverse to a cable positioned thereon and having a stripping edge arranged to rotate about said axis when said first member is rotated about said axis with respect to said second member whereby said blade edge moves along said surface at a constant distance from said axis, the dimension between said blade edge and said axis being selectable whereby said blade may strip insulation from said conductor only to a predetermined depth thereof.

3. A tool for stripping insulation from an insulated conductor cable comprising: a first member having spaced-apart jaws; a second handle member pivotally mounted between said jaws about a reference axis; said first member having a handle portion and a tool mounting portion joining said jaws on sides opposite said axis; said second member providing a conductor receiving surface thereon between said axis and said tool mounting portion of said first member, said surface being defined by a rotation of a line about said axis; said tool mounting portion being adapted to receive a tool thereon having a stripping edge extending laterally with respect to a conductor cable positioned on said surface; said stripping edge being relatively rotatable about said axis with respect to said surface whereby said edge moves along said surface at a constant distance therefrom, the dimension between said edge and said axis being selectable whereby said blade may strip insulation from said conductor only to a predetermined depth thereof.

4. The tool of claim 3 wherein said stripping edge upon operation thereof moves through an angle greater than the angle subtended by said surface with respect to said reference axis.

5. A tool for stripping insulation from an insulated conductor cable comprising: a first member having spaced-apart jaws extending from a handle portion; a second handle member pivotally mounted about a reference axis intermediate its ends between said jaws; said first member having a tool mounting portion joining said jaws; said second member providing a conductor receiving surface thereon between said axis and said tool mounting portion of said first member, said surface being defined by a rotation of a line about said axis; positioning means on said second member adapted to position a conductor thereon so that a predetermined area of the conductor cable will overlie said surface; said tool mounting portion adapted to receive a tool thereon having a stripping edge extending across said surface transverse to a conductor cable positioned thereon and being arranged to rotate with respect to said surface when said second member is rotated about said axis relative to said first member whereby said edge moves along said surface at a constant distance from said axis, the dimension between said blade edge and said axis being selectable whereby said blade may strip insulation from said conductor only to a predetermined depth thereof.

6. In a plier-like stripper for stripping insulation from an insulated conductor, a pair of levers pivotally interconnected intermediate their ends about a reference axis and each having at one end a handle portion, one of said levers having an arcuaate cable-supporting anvil thereon at the end portion remote from the handle portion of the lever, said anvil being formed substantially on a radius extending from said axis, an insulation stripper comprising a blade mounted on the other lever at the end portion thereof remote from the handle portion of the lever, the blade extending parallel to said axis and being arcuately movable over said anvil in substantially parallel relation thereto upon relative pivotal movement of said handle portions, and means to secure an insulated conductor with reference to said anvil.

7. In a plier-like stripper for stripping insulation from an insulated conductor, a pair of levers pivotally interconnected intermediate their ends about a reference axis and each having at one end a handle portion, one of said levers having an arcuate cable-supporting anvil thereon at the end portion remote from the handle portion of the lever, said anvil being formed substantially on a radius extending from said axis, an insulation stripper comprising a blade mounted on the other lever at the end portion thereof remote from the handle portion of the lever, the blade extending parallel to said axis and being arcuately movable over said anvil in substantially parallel relation thereto upon relative pivotal movement of said handle portions, and means to secure an insulated conductor with reference to said anvil, the blade having a greater distance of travel than the arc of said anvil and being mounted for adjustment toward and away from said anvil to remove a greater or lesser thickness of insulation.

References Cited by the Examiner
UNITED STATES PATENTS

| | | | |
|---|---|---|---|
| 624,061 | 5/1899 | Masson et al. | 90—32 |
| 654,935 | 7/1900 | Batcheller | 90—31 |
| 1,802,453 | 4/1931 | Wright | 81—9.51 |
| 2,484,948 | 10/1949 | Iafrate | 15—2364 |
| 2,567,149 | 9/1951 | Errig et al. | 157—13 |
| 2,788,851 | 4/1957 | Rawls et al. | 157—13 |
| 2,981,129 | 4/1961 | Adams | 81—9.51 |
| 3,102,444 | 9/1963 | Basile | 81—9.5 |

WILLIAM FELDMAN, *Primary Examiner.*

MILTON S. MEHR, M. HENSON WOOD, JR.,
*Examiners.*